C. E. RUBOTTOM.
WIND WHEEL.
APPLICATION FILED OCT. 31, 1916.
1,249,206.
Patented Dec. 4, 1917.
4 SHEETS—SHEET 4.
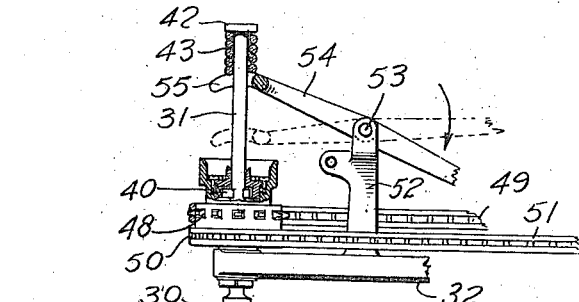
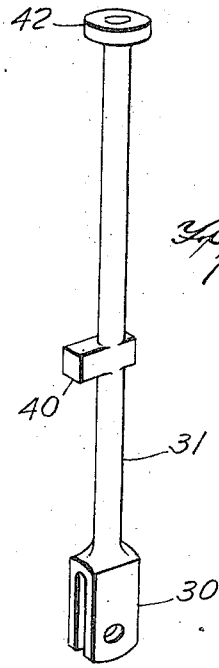
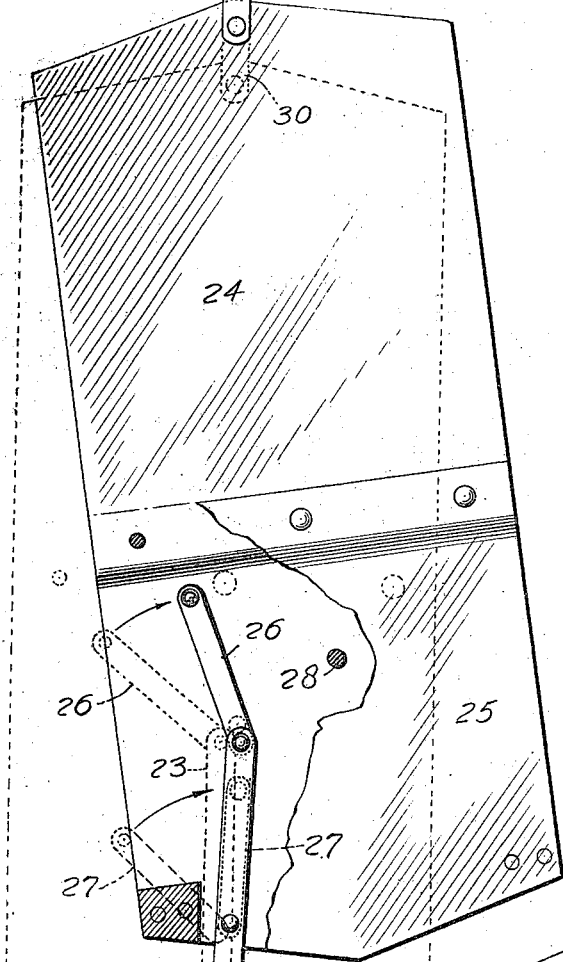
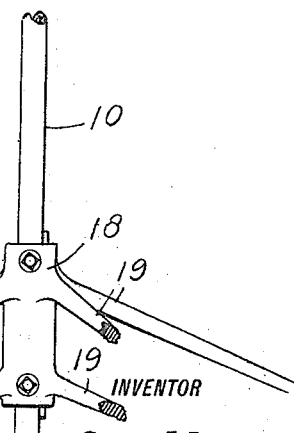
Fig. 9.
Fig. 8.
WITNESSES:
INVENTOR
Charles E. Rubottom,
BY
ATTORNEYS

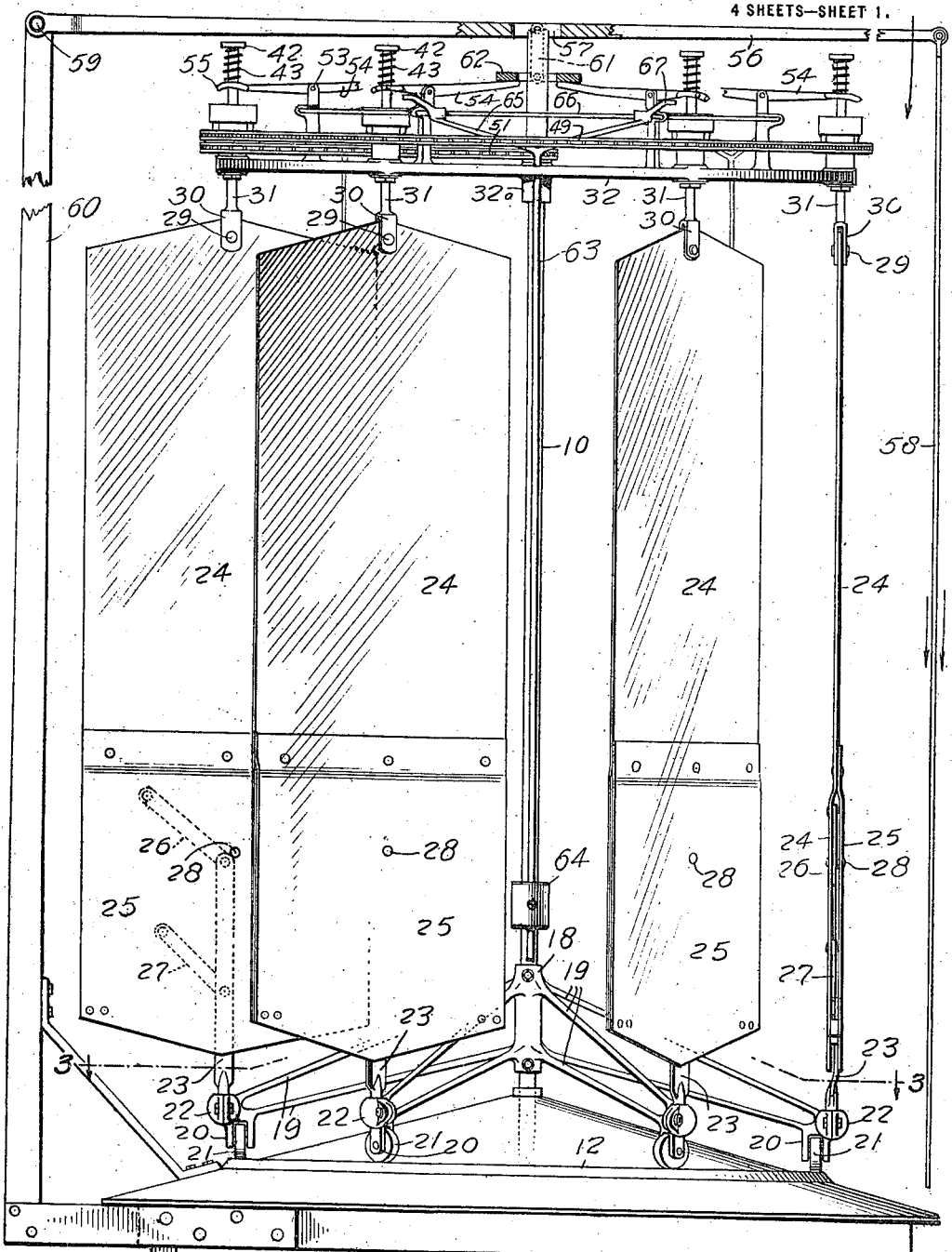

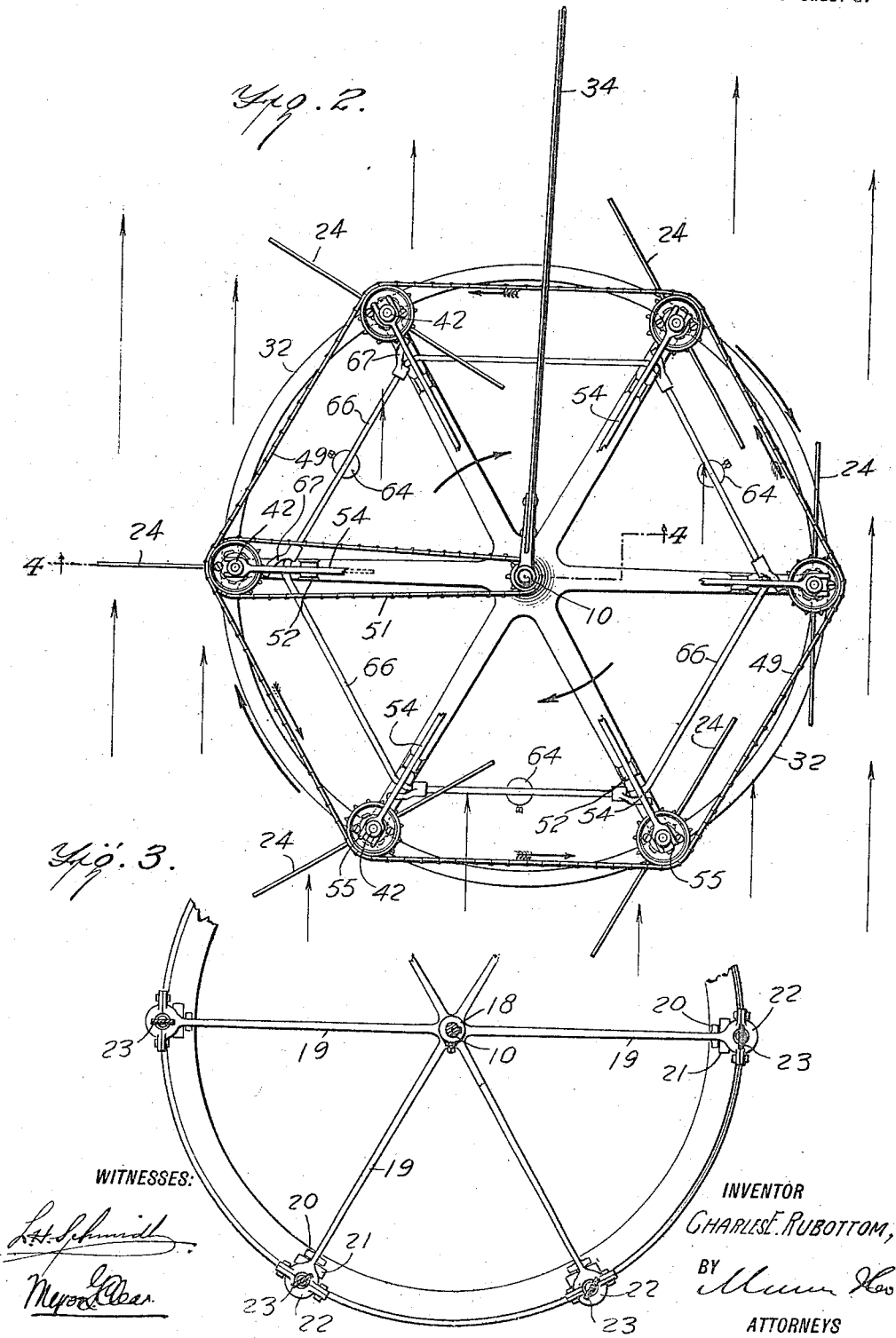

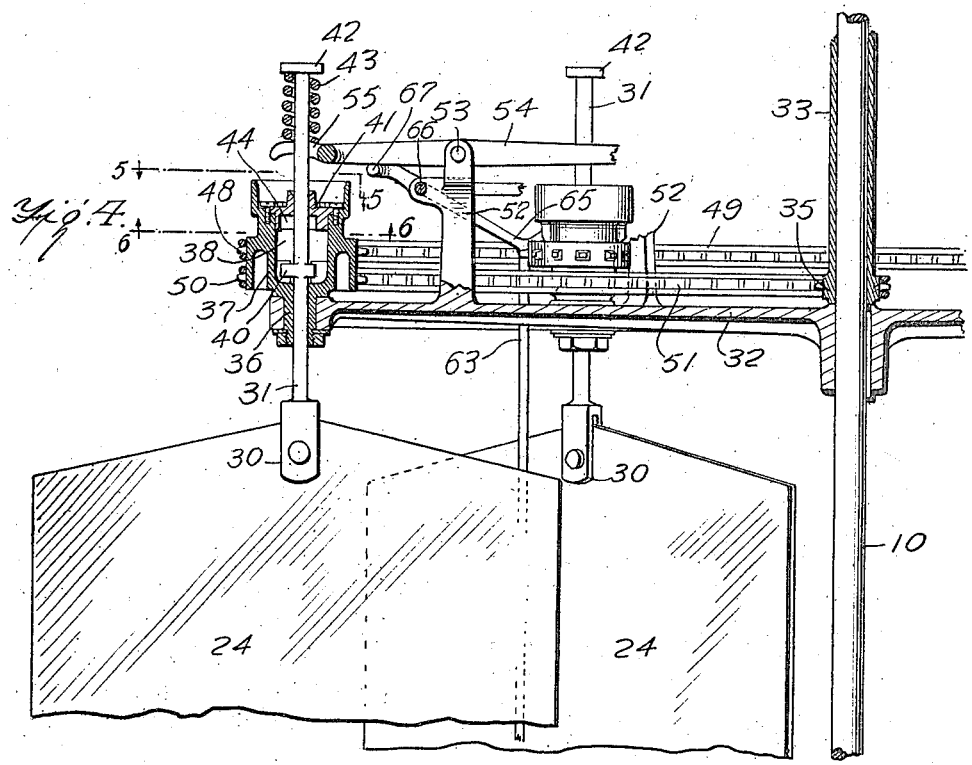
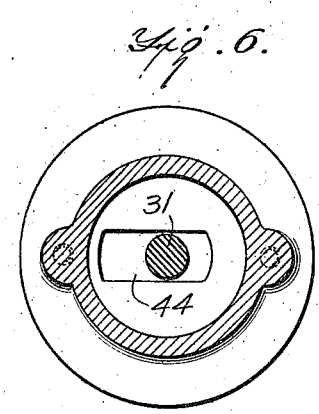
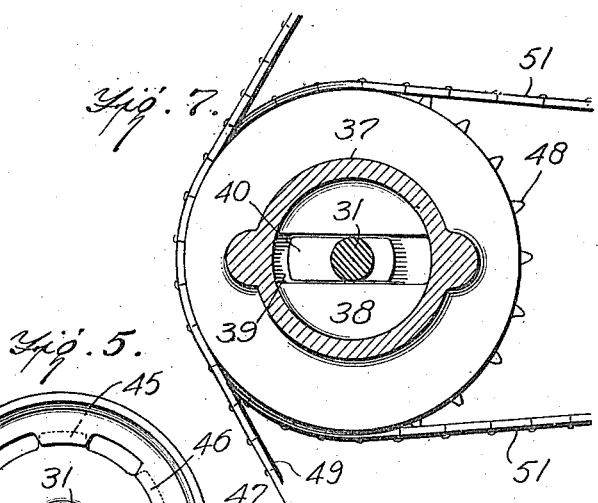
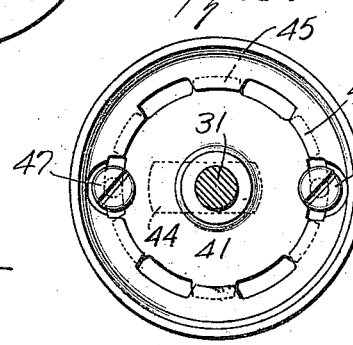

UNITED STATES PATENT OFFICE.

CHARLES EDGAR RUBOTTOM, OF GLOBE, ARIZONA, ASSIGNOR OF ONE-FOURTH TO HARRY HOUSER, OF GLOBE, ARIZONA.

WIND-WHEEL.

1,249,206. Specification of Letters Patent. Patented Dec. 4, 1917.

Application filed October 31, 1916. Serial No. 128,663.

*To all whom it may concern:*

Be it known that I, CHARLES E. RUBOTTOM, a citizen of the United States, and a resident of Globe, in the county of Gila and State of Arizona, have invented a certain new and useful Improvement in Wind-Wheels, of which the following is a specification.

My present invention relates generally to wind wheels, and more particularly to a wind wheel having a series of rotating wings, the structure, action, and control of which are, in accordance with my invention, intended to materially increase the efficiency of the wheel in practical use, my primary object being to provide an arrangement producing greatly increased wind resistance in one direction, and correspondingly decreased wind resistance in the other direction.

Other objects, relating for the most part to details of construction, arrangement, and combination of parts, together with the advantages derived therefrom, will be more readily understood by reference to the accompanying drawings, forming a part of the following specification, and in which—

Figure 1 is a side elevation of my improvement.

Fig. 2 is a top plan view thereof.

Fig. 3 is a partial horizontal section taken substantially on line 3—3 of Fig. 1.

Fig. 4 is a detail vertical section taken substantially on line 4—4 of Fig. 2.

Figs. 5 and 6 are detail horizontal sections taken respectively on lines 5—5 and 6—6 of Fig. 4, looking in the direction of the arrows.

Fig. 7 is a view similar to Fig. 6 looking in the opposite direction.

Fig. 8 is a detail view partly broken away and in section, illustrating one of the wings in inoperative position.

Fig. 9 is a detail perspective view of one of the wing stems removed.

Referring now to these figures, and particularly to Fig. 1, my improvements are mounted in connection with a driven shaft 10 disposed vertically and projecting centrally through a support 11 having an annular track 12, the driven shaft 10 being provided with a balance wheel 13 below the support 11 and with a worm 14 below the balance wheel, the latter in engagement with worm wheel 15, each provided with a crank 16 from which a pitman 17 leads in order to apply the power of shaft 10, thus converted into reciprocatory motion, at a distant point, for instance, the pump rod below the wind wheel.

Rigidly secured to the driven shaft 10 at a point immediately above the support 11, is a supporting bracket 18 having radially outstanding arms 19, at the outer ends of which are depending forks 20 supporting rollers 21, the latter engaging the annular track 12 of the support and being preferably of ball bearing type in order to reduce the friction of contact, the outer ends of arms 19 also supporting sockets 22 into which extend the ball-shaped lower ends of upright supporting levers 23, each of which coöperates with certain other supports to be hereinafter described to maintain each of the wings 24 in rotatable and laterally shiftable relation to the frame of the wheel, of which the lower bracket 18 constitutes the lowermost part.

Each of the wings 24 is disposed in upright position and preferably consists of a single sheet of metal having an additional plate 25 secured to the lower portion thereof and in spaced relation thereto to receive the corresponding lever 23 between the lower portion of the sheet 24 and the plate 25, as best seen at the right of Fig. 1, the lever so disposed being normally held in alinement with the longitudinal axis of the wings and hence in a vertical position midway between the lower side edges of the wings through the weight of the latter and its connection therewith as now described. At its upper end and at an intermediate point, each lever 23 is respectively pivoted to arms or links 26 and 27, the opposite ends of which links are pivotally connected to the respective wing 24. These links 27 normally extend in inclined position when the upper end of the lever 23 engages a stop pin 28 by which it is arrested and held in normal position, the arms or links 27 permitting the wing to be raised and thus shifted laterally and inwardly toward the shaft 10, for instance, if the wings are standing radially with respect thereto.

At its upper end, and at a point centrally to each of its side edges, each of the wings 24 is pivotally connected at 29, to the lower forked end 30 of a supporting stem 31, which projects upwardly through its respective opening in an upper rotating plate 32, constituting the upper portion of the frame of the wheel.

The hub 32ª of the plate 32 is secured to the shaft 10, and a sleeve 33 loosely surrounds the upper portion of the said shaft above the said plate, a wind vane 34, such as shown in Fig. 2 being secured to the upper portion of the sleeve 33, and a gear wheel 35 being rigid with the lower end of the sleeve and located immediately above the plate 32, as seen in Fig. 4.

The openings of the plate 32 through which the stems 31 project are spaced from one another in a series around the plate and at the ends of the radial arms thereof, as shown in Fig. 2, the plate being of skeleton form, and each opening receives the reduced lower portion 36 of a gear member 37, rotatable in the opening and projecting above the plate 32, as clearly seen by reference to Fig. 4, each gear member 37 having an upwardly opening central bore 38, in the case of which is a diametrical slot 39, as clearly seen by reference to Figs. 4 and 7.

Each stem 31, one of which is seen in detail in Fig. 9, is provided with an intermediate squared lateral projection or lug 40 movable in the bore 38 of the respective gear member and normally seated in the diametrical slot 39 at the base of the bore, so that rotative movement of the gear member may be thus communicated to the stem.

Seated to cover the bore 38 of each of the gear members 37 is a cap 41 vertically through which the upper portion of the stem 31 extends, the upper extremity of this stem being provided with a head 42 against which the upper end of a spring 43 bears, the spring being coiled around the upper portion of the said stem. The cap 41 just mentioned is provided in its lower face with a slotted opening 44 adapted to receive the stem lug 40 when the stem 31 is raised. The cap 41 is also provided with peripheral outstanding lugs 45, as seen in Fig. 5, said lugs being movable downwardly between similar inwardly projecting lugs 46 of the gear member 37, when the cap 41 is placed upon its seat, as seen in Fig. 4. Thus, when the cap is slightly rotated in one direction or the other with respect to the gear member, the relative engagement of the lugs 45 and 46 will prevent upward movement of the cap 41 away from its seat. The cap 41 as thus held, is locked against rotative movement by means of clamping screws 47 threaded into gear member 37 at opposite sides of the upper portion of its bore 38, which screws bear directly upon the said cap 41 when the latter is in position.

The spaced annular series of gear members 37 each of which have sprocket teeth 48, are connected by an annular sprocket chain 49 extending around the series and of endless form, so as to communicate the rotative movements of any one gear member of the series to all of the others, one of the said gear members being also provided with sprocket teeth 50, as seen in Fig. 4, connected by a sprocket chain 51 to the gear 35 of the main control sleeve 33.

Mounted on each of the arms of the skeleton plate 32 adjacent its outer end and adjacent the respective gear member 37, is an upright bearing post 52, to the upper end of which at 53, is intermediately pivoted a lever 54 the inner end of which projects to a point adjacent the sleeve 33, as shown in Fig. 1, and the outer end of which has a fork 55 receiving the upper end of the stem 31 below the spring 43, so that when the inner ends of the several levers 54 are depressed, their outer ends are thrown upwardly and against the springs 43, lifting the several wings and their stems 31 so as to raise the intermediate lugs 40 of the stems out of the diametrical slots 39 at the bases of the bores 38 of the gear members 37. When elevated within the bores 38, constituting the neutral position, the several stems 31 are then freed from rotation with the gear member. Furthermore this upward movement of the several stems when continued serves to thrust the intermediate lugs 40 of the stems into the slotted openings 44 in the lower faces of the cap 41, which latter openings 44 are so placed and adjusted, by the adjustment of the cap 41 with respect to the wings, as to hold the latter in neutral position so as to be unaffected by the wind pressure, the vertical movements of the several wings 24 with their stems 31, serving to shift the wings laterally by virtue of their supporting levers 23 and the connections thereof, as previously described.

The several levers 54 may be actuated in various ways, as for instance by a lever 56 extending diametrically across the upper portion of the frame, with an intermediate opening 57 surrounding the shaft 10 and sleeve 33, the free end of said lever having a depending flexible actuating connection 58 and the opposite end thereof being pivoted at 59 upon an upright extension 60 of the support 11, as best seen in Fig. 1. From this figure it will also be seen that the lever 56 is provided at a central point with depending arms 61 to the lower ends of which a ring 62 is swiveled so that upon lowering movement of the flexible connection 58, the ring 62 is depressed upon the inner ends of the levers 54 and thrusts the latter downwardly, for the purpose previously described.

In order to automatically accomplish the lifting and tilting of the wings in case of greater than desired speed of the wheel, I may utilize a series of governor levers 63 between certain of the arms of the upper plate 32, said levers having adjustable weights 64 and diverging arms 65. The arms 65 are fulcrumed upon a rod 66 extending around the upper plate 32 and through extensions of the brackets 52, the outer extremities 67 of said arms 65 being bent outwardly and angularly beneath the outer ends of levers 54, so that when the levers 63 swing outwardly under excessive speed of the vehicle, the outer ends of the levers 54 will be raised for the purpose above mentioned.

It is apparent from the foregoing that, with proper adjustment of the controlling parts, the vanes 24 will, through the connecting chains 51 and 49, control the positions of all of the wings 24 in accordance with the direction of the wind current, and will hold the sleeve 33 substantially stationary during action of the apparatus, so that in the revolution of the several gear members 37 of the series around the central shaft 10, rotation of the gear members in unison will also be effected by the chains 51 and 49, it being noted that each of the said gear members is twice the size of the gear member 35 of the sleeve 33, so that during a complete revolution of shaft 10, the several gear members will be rotated a half turn.

It will further be understood that with the several wings properly adjusted in the first instance, and with a series of six wings in all as plainly seen in Fig. 2, five out of the six wings will always be in position to assist in the rotation of the wheel in action, against the pressure of the air currents, and that the sixth wheel will be in neutral position edgewise toward the air currents.

I am thus enabled to provide a wind wheel offering maximum resistance to the air currents in one direction, and minimum resistance to the air currents in the other direction, and it is obvious that, while the means I have shown and specifically described for this purpose are for many reasons to be desired, and so far as I am at present aware, to be preferred, the same result may be obtained by mechanism considerably changed as to the several details of construction it has been necessary for me to enlarge upon in the foregoing description, and it is my desire therefore to reserve all such changes, variations, and modifications as fall within the spirit of the invention and the terms of the appended claims.

I claim:—

1. In a wind wheel, the combination of a driven shaft, a frame secured upon the said shaft and including an upper plate and a lower bracket, the latter being provided with rollers, a support having an annular track upon which the rollers are disposed, a plurality of wings disposed vertically between the upper plate and the lower bracket, connections between the upper and lower ends of said wings and the said plate and bracket and supporting the wings in rotatable and laterally shiftable relation within the frame, means for rotating the several wings during their revolution with the frame around the shaft, and means for shifting the wings, for the purpose described.

2. In a wind wheel, the combination of a driven shaft, a frame secured upon the shaft and including an upper plate and a lower bracket, a plurality of wings disposed vertically and rotatable between the upper plate and the lower bracket, connections between the upper and lower ends of the said wings and the plate and the bracket and supporting the wings in vertically and laterally shiftable relation, means normally acting to rotate the said wings during their revolution about the shaft, and means for shifting the wings vertically to disrupt said first named means and move the wings to inoperative position.

3. In a wind wheel, the combination of a driven shaft, a frame secured upon the shaft and including an upper plate and a lower bracket, a plurality of wings disposed vertically and rotatable between the upper plate and the lower bracket, connections between the upper and lower ends of the said wings and the plate and the bracket and supporting the wings in vertically and laterally shiftable relation, means normally acting to rotate the said wings during their revolution about the shaft, and means for shifting the wings vertically to disrupt said first named means and move the wings to inoperative position, said last named means including manually controlled actuating connections, substantially as described.

4. In a wind wheel, the combination of a shaft, a frame secured upon and rotatable with the shaft, a plurality of wings disposed vertically in the frame around the shaft and rotatable and vertically shiftable therein, each of said wings having a vertically projecting stem at its upper end, a gear member through which the stem is rotatably and longitudinally movable, having a bore, and a diametrical slot at the base of the bore, the said stem being provided with an intermediate laterally projecting lug normally seated in the bore, connections engaging the said gear member for constantly rotating the wings during revolution around the shaft, and means for elevating the wing and its stem to withdraw the lug of the latter out of the slot of its respective gear member, for the purpose described.

5. In a wind wheel, the combination of a shaft, a frame secured upon and rotatable with the shaft, a plurality of wings disposed vertically in the frame around the shaft and rotatable and vertically shiftable therein, each of said wings having a vertically projecting stem at its upper end, a gear member through which the stem is rotatably and longitudinally movable, having a bore, and a diametrical slot at the base of the bore, the said stem being provided with an intermediate laterally projecting lug normally seated in the bore, connections engaging the said gear member for constantly rotating the wings during revolution around the shaft, and means for elevating the wing and the stem to withdraw the lug of the latter out of the slot of its respective gear member, said means including a plurality of levers one for each of the wings and engaging the stem thereof, the levers having their free ends adjacent one another, and a manually controlled lever having means for engagement with the free ends of the said stem actuating levers to operate the same.

6. In a wind mill, the combination of a shaft, a frame secured upon the shaft, a sleeve loosely disposed on the shaft above the frame, a directing vane secured to said sleeve, a gear fixed to said sleeve, a plurality of wings disposed vertically in the frame and revoluble therewith around the shaft, each of said wings being rotatable independently of the frame and having a gear member, a chain connecting the several gear members of the wings to constrain the several wings to simultaneous rotation, a chain connecting one of said gear members with the gear of said sleeve whereby to control the rotation of the said wings, and means for shifting each of the wings vertically and laterally to and from operative position.

7. In a wind wheel, the combination of a driven shaft, a frame secured upon the shaft and including an upper plate and a lower bracket, a plurality of wings disposed vertically and rotatable between the upper plate and the lower bracket, connections between the upper and lower ends of the said wings and the plate and the bracket and supporting the wings in vertically and laterally shiftable relation, means normally acting to rotate the said wings during their revolution about the shaft, and means for shifting the wings vertically to disrupt said first named means and move the wings to inoperative position, said last named means including automatically acting governor levers operable upon excessive speed of the wheel.

CHARLES EDGAR RUBOTTOM.

Copies of this patent may be obtained for five cents each, by addressing the "Commissioner of Patents, Washington, D. C."